(12) United States Patent
Lyons

(10) Patent No.: US 9,303,807 B1
(45) Date of Patent: Apr. 5, 2016

(54) PIPE INSTALLATION TRANSITION FITTING AND PIPE INSTALLATION METHOD

(76) Inventor: Tracy Lyons, Junction City, LA (US)

( * ) Notice: Subject to any disclaimer, the term of this patent is extended or adjusted under 35 U.S.C. 154(b) by 744 days.

(21) Appl. No.: 13/456,982

(22) Filed: Apr. 26, 2012

(51) Int. Cl.
*F16L 55/18* (2006.01)
*F16L 55/128* (2006.01)
*F16L 55/115* (2006.01)

(52) U.S. Cl.
CPC ............ *F16L 55/115* (2013.01); *F16L 55/1283* (2013.01)

(58) Field of Classification Search
CPC .......................... F16L 55/115; F16L 55/1283
USPC ...................... 138/90, 97, 96 R, 98
See application file for complete search history.

(56) References Cited

U.S. PATENT DOCUMENTS

| | | | | |
|---|---|---|---|---|
| 2,725,898 A | * | 12/1955 | Stansbury | 138/96 R |
| 3,218,659 A | * | 11/1965 | Rowley | 15/104.061 |
| 3,978,708 A | * | 9/1976 | Hayward | 73/1.18 |
| 4,273,605 A | * | 6/1981 | Ross | B08B 9/047 |
| | | | | 138/140 |
| 4,393,805 A | * | 7/1983 | Boer | B05C 7/08 |
| | | | | 118/103 |
| 4,688,632 A | * | 8/1987 | Cooley, Jr. | 166/85.5 |
| 4,818,314 A | * | 4/1989 | Brittain et al. | 156/87 |
| 4,950,446 A | * | 8/1990 | Kinumoto | B29C 49/26 |
| | | | | 138/97 |
| 5,219,244 A | * | 6/1993 | Skeels | 405/158 |
| 5,451,284 A | * | 9/1995 | Ikeda | F16L 55/179 |
| | | | | 138/97 |
| 5,660,202 A | * | 8/1997 | Rush et al. | 137/318 |
| 6,227,764 B1 | * | 5/2001 | Einhaus | F16L 55/179 |
| | | | | 138/98 |
| 6,382,875 B1 | * | 5/2002 | Plumettaz | 405/184.2 |
| 6,701,966 B1 | * | 3/2004 | Higman | F16L 55/1651 |
| | | | | 138/97 |
| 6,769,152 B1 | * | 8/2004 | Crenshaw et al. | 15/104.062 |
| 8,225,809 B2 | * | 7/2012 | Krywitsky | 137/15.07 |
| 8,646,488 B1 | * | 2/2014 | Shindelar et al. | 138/96 R |
| 2009/0188577 A1 | * | 7/2009 | Malone et al. | 138/90 |

* cited by examiner

*Primary Examiner* — James Hook
(74) *Attorney, Agent, or Firm* — R. Keith Harrison

(57) ABSTRACT

A pipe installation transition fitting includes a transition fitting housing having a housing interior, a fitting attachment mechanism carried by the transition fitting housing and a pressurization port carried by the transition fitting housing and having a pressurization port opening communicating with the housing interior of the transition fitting housing.

17 Claims, 5 Drawing Sheets

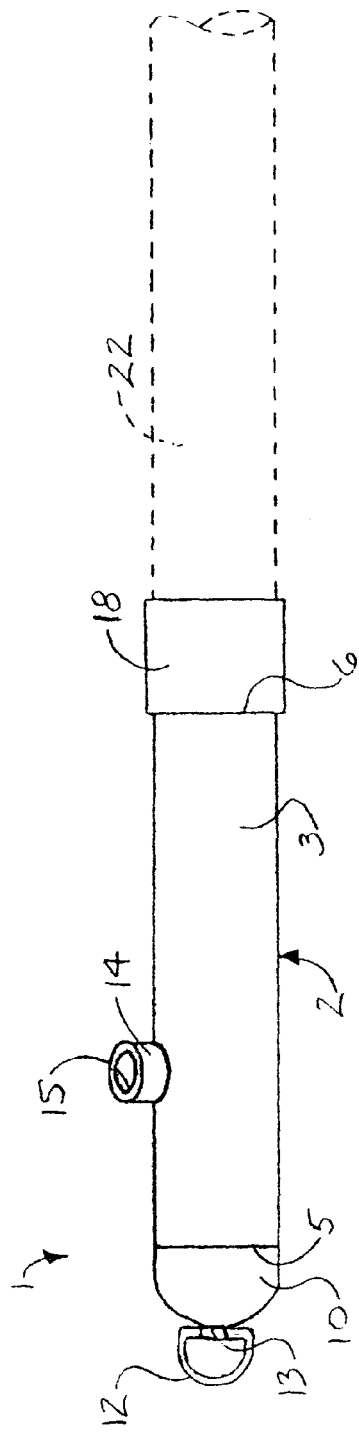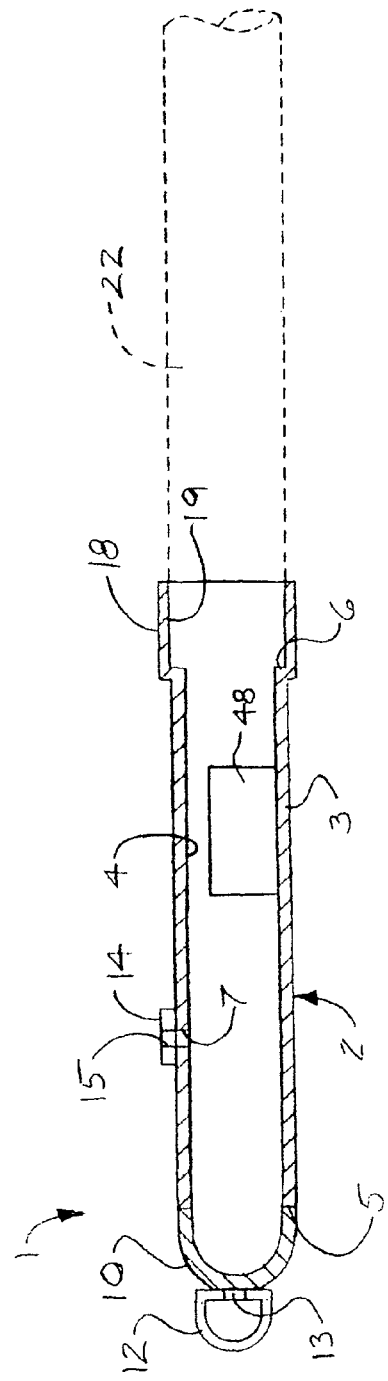
FIG. 1
FIG. 2

PIPE INSTALLATION TRANSITION FITTING AND PIPE INSTALLATION METHOD

FIELD

Embodiments of the disclosure generally relate to installation of utility pipes and the like. More particularly, embodiments of the disclosure relate to a pipe installation and transition fitting and a pipe installation method in which pipe installation and blockage and leakage testing are accomplished using a single fitting.

BACKGROUND

Installation of utility pipes such as gas and water lines, for example, typically includes forming a subterranean bore; attaching a pull head to the pipe which is to be installed; pulling the pipe through the bore; cutting the pull head from the pipe; attaching a test fitting to the pipe; "pigging" the line for blockage testing by blowing a foam cylinder from the pipe using pressurized air; capping the open end of the pipe; and testing the pipe for leaks by flowing pressurized air into the pipe. This procedure, however, is costly and time-consuming from the standpoint of time, labor and materials since the pull head which is used to pull the pipe through the trench must be removed from the pipe and a separate fitting installed on the pipe for "pigging" and testing.

Accordingly, a pipe installation transition fitting and pipe installation method in which pipe installation and blockage and leakage testing are accomplished using a single fitting are needed.

SUMMARY

Embodiments of the disclosure are generally directed to a pipe installation transition fitting including a transition fitting housing having a housing interior, a fitting attachment mechanism carried by the transition fitting housing and a pressurization port carried by the transition fitting housing and having a pressurization port opening communicating with the housing interior of the transition fitting housing.

Embodiments of the disclosure are further generally directed to a pipe installation method. An illustrative embodiment of the pipe installation method includes providing a pipe installation transition fitting having a transmission fitting housing and a fitting attachment mechanism and a pressurization port on the transition fitting housing; forming a subterranean bore; attaching a pipe to the pipe installation transition fitting; attaching a pipe pulling apparatus to the fitting attachment mechanism; pulling the pipe into place in the subterranean bore by operation of the pipe pulling apparatus; maintaining the pipe installation transition fitting in place on the pipe; testing the pipe by flowing pressurized air through the pressurization port into the transmission fitting housing and the pipe; detaching the pipe from the pipe installation transition fitting; and placing the pipe into service.

BRIEF DESCRIPTION OF THE DRAWINGS

Embodiments of the disclosure will now be described, by way of example, with reference to the accompanying drawings, in which:

FIG. 1 is a perspective view of an illustrative embodiment of the pipe installation transition fitting, with a pipe (illustrated in phantom) attached to the fitting preparatory to installation of the pipe in a subterranean bore;

FIG. 2 is a longitudinal sectional view of an illustrative embodiment of the pipe installation transition fitting, with a pipe (illustrated in phantom) attached to the fitting;

DETAILED DESCRIPTION

Figure 3:
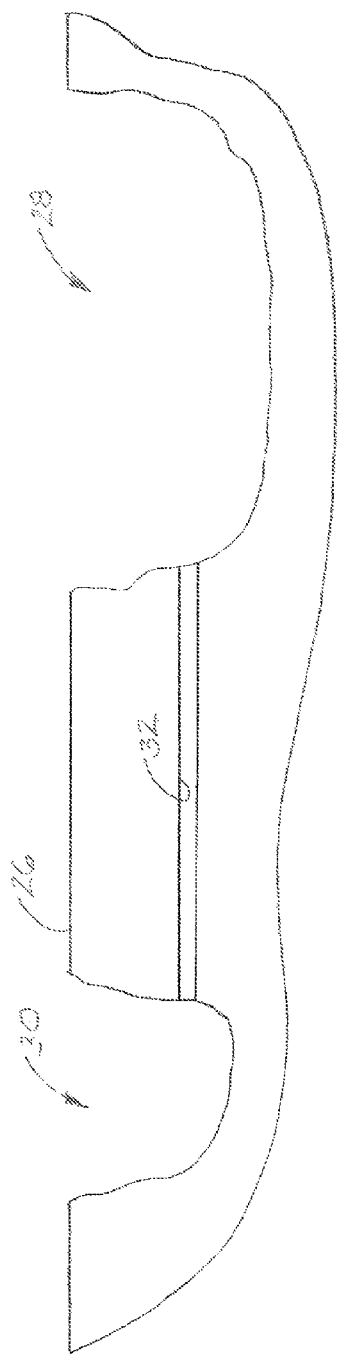
FIGS. 3-8 are sectional views of a subterranean bore, more particularly illustrating an exemplary installation procedure for installing a pipe in the bore using the pipe installation transition fitting.

The following detailed description is merely exemplary in nature and is not intended to limit the described embodiments or the application and uses of the described embodiments. As used herein, the word "exemplary" or "illustrative" means. "serving as an example, instance, or illustration." Any implementation described herein as "exemplary" or "illustrative" is non-limiting and is not necessarily to be construed as preferred or advantageous over other implementations. All of the implementations described below are exemplary implementations provided to enable persons skilled in the art to practice the disclosure and are not intended to limit the scope of the appended claims. Moreover, the illustrative embodiments described herein are not exhaustive and embodiments or implementations other than those which are described herein and which fall within the scope of the appended claims are possible. Furthermore, there is no intention to be bound by any expressed or implied theory presented in the preceding technical field, background, brief summary or the following detailed description. Relative terms such as "front" and "rear" as used herein are intended for descriptive purposes only and are not necessarily intended to be construed in a limiting sense.

Referring initially to FIGS. 1 and 2 of the drawings, an illustrative embodiment of the pipe installation transitional fitting, hereinafter fitting, is generally indicated by reference numeral 1. As illustrated in FIGS. 3-8 and will be hereinafter described, the fitting 1 is adapted to facilitate installation of a pipe 22 such as an underground gas, water, sewage, telephone or other utility pipe in a subterranean bore 32 (FIG. 5) beneath the ground 26. The fitting 1 facilitates installation, blockage testing or "pigging", and leakage testing of the pipe 22 using the single fitting 1 without the necessity of using separate fittings for these purposes.

The various components of the fitting 1, which will be hereinafter described, may be steel, aluminum, plastic such as high-density polypropylene, carbon fiber composite and/or any other material which is consistent with the functional requirements of the fitting 1. The fitting 1 includes a transition fitting housing 2 having a housing wall 3. In some embodiments, the housing wall 3 may be generally elongated and cylindrical. The housing wall 3 may have a front housing end 5 and a rear housing end 6 which is opposite the front housing end 5. The housing wall 3 forms or partially encloses a housing interior 4 (FIG. 2) which extends between the front housing end 5 and the rear housing end 6.

A transition fitting cap 10 may be provided on the front housing end 5 of the housing wall 3. The transition fitting cap 10 may be generally tapered, concave or dome-shaped, as illustrated. In some embodiments, the transition fitting cap 10 may be attached to the front housing end 3 of the transition fitting housing 2 via welding and/or other suitable attachment technique known by those skilled in the art. In other embodiments, the transition fitting cap 10 may be fabricated in one piece with the housing wall 3 via casting, molding and/or other fabrication techniques known by those skilled in the art.

A pipe receptacle 18 may extend from the rear housing end 6 of the housing wall 3. The pipe receptacle 18 has a pipe receptacle interior 19 with a width or diameter which is larger than the width or diameter of the housing interior 4 of the transition fitting housing 2. The pipe receptacle interior 19 of the pipe receptacle 18 is sized and configured to receive an end of the pipe 22 (FIG. 5) which is to be installed in the subterranean bore 32, as will be hereinafter described.

A pressurization port 14 may be provided on the exterior surface of the housing wall 3. The pressurization port 14 may be disposed between the front housing end 5 and the rear housing end 6 of the transition fitting housing 2. The pressurization port 14 has a pressurization port opening 15. As illustrated in FIG. 2, an air flow opening 7 extends through the housing wall 3 and registers with the pressurization port opening 15 of the pressurization port 14. The air flow opening 7 establishes fluid communication between the housing interior 4 of the transition fitting housing 2 and the pressurization port opening 15 of the pressurization port 14.

In operation of the fitting 1, as will be hereinafter further described, the pressurization port 14 facilitates establishment of fluid communication between a pneumatic pressurization apparatus 38 (FIG. 6) and the housing interior 4 of the transition fitting housing 2. In some embodiments, the pressurization port 14 may include any structure or mechanism which facilitates attachment of the pressurization apparatus 38 to the transition fitting housing 2. Attachment mechanisms which are suitable for the purpose include but are not limited to threads, clips and clamps.

A fitting attachment mechanism 12 is provided on the transition fitting cap 10. The fitting attachment mechanism 12 may be any structure which facilitates attachment of the transition fitting housing 2 to a pipe pulling cable 34 (FIG. 4) which facilitates pulling of the device 1 in place into the subterranean bore 32 in operation of the fitting 1. In some embodiments, the fitting attachment mechanism 12 may include a D-ring, as illustrated. The D-ring may be pivotally attached to the transition fitting cap 10 at a pivot 13. In other embodiments, the fitting attachment mechanism 12 may include a ring of any design, size or shape or a clip, clamp, clevis, hook, threaded shaft or the like. The fitting 1 may be fabricated in various sizes to accommodate pipes 22 having various sizes.

Referring next to FIGS. 3-8 of the drawings, sequential operation of the fitting 1 in installation of a pipe 22 in a subterranean bore 32 is illustrated. As illustrated in FIG. 3, a pipe insertion opening 28 and a pipe pulling opening 30 may be formed in the ground 26 in spaced-apart relationship to each other. A subterranean bore 32 is formed between the pipe insertion opening 28 and the pipe pulling opening 30 using trenchless, trenched or plowing techniques known by those skilled in the art. The subterranean bore 32 establishes communication between the pipe insertion opening 28 and the pipe pulling opening 30.

Figure 4:
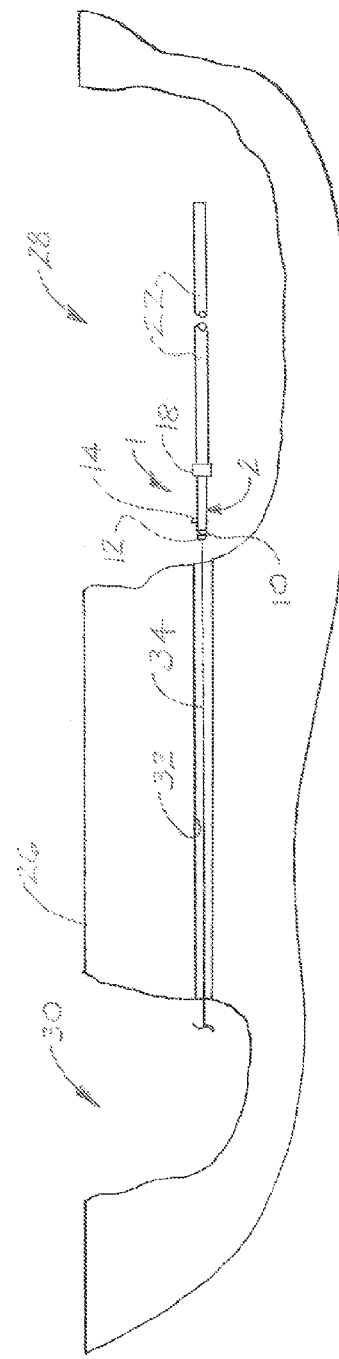

As illustrated in FIG. 4, in the pipe insertion opening 28, a pipe 22 is inserted in the pipe receptacle interior 19 (FIG. 2) of the pipe receptacle 18 of the fitting 1. The pipe 22 may be gas, water, sewage, telephone or other utility pipe of any size or material. The pipe 22 may be attached to the pipe receptacle 18 using plastic welding or alternative attachment techniques which are known by those skilled in the art and suitable for the purpose. Prior to attachment of the pipe 22 to the fitting 1, a "pig" 48 (FIG. 2) may be placed in the housing interior 4 of the transition fitting housing 2. The pig 48 may be a foam cylinder or the like as is known by those skilled in the art. A pipe pulling apparatus (not illustrated), which may be conventional, is placed in the pipe pulling opening 30. A pipe pulling cable 34 of the pipe pulling apparatus is extended from the pipe pulling opening 30 through the subterranean bore 32 to the pipe insertion opening 28. The end of the pipe pulling cable 34 which emerges from the subterranean bore 32 into the pipe insertion opening 28 is attached to the fitting attachment mechanism 12 on the transition fitting cap 10 of the device 1.

Figure 5:
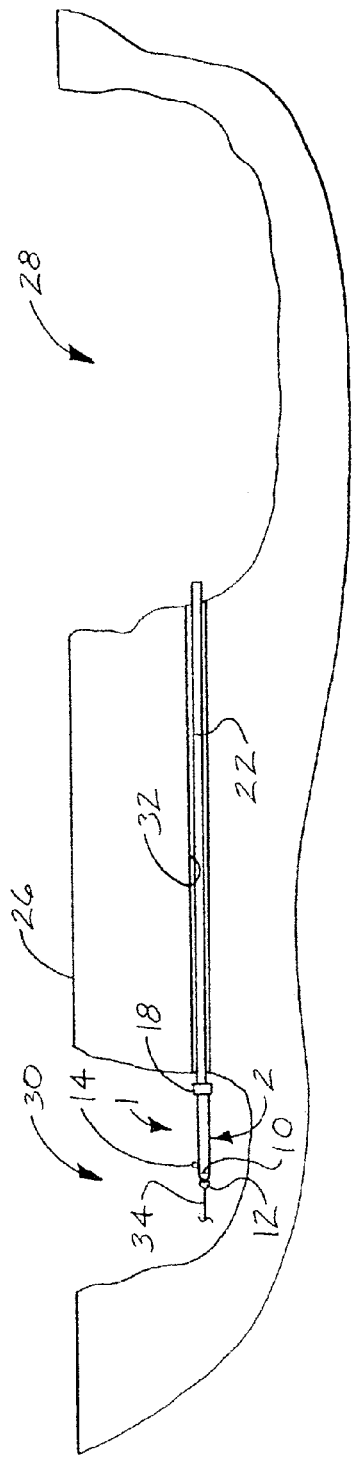

As illustrated in FIG. 5, the pipe pulling apparatus (not illustrated) is operated to pull the pipe pulling cable 34 through the subterranean bore 32. In turn, the pipe pulling cable 34 pulls the device 1 and the device 1 pulls the pipe 22 through the subterranean bore 32 typically until the pipe 22 reaches the pipe pulling opening 30.

Figure 6:
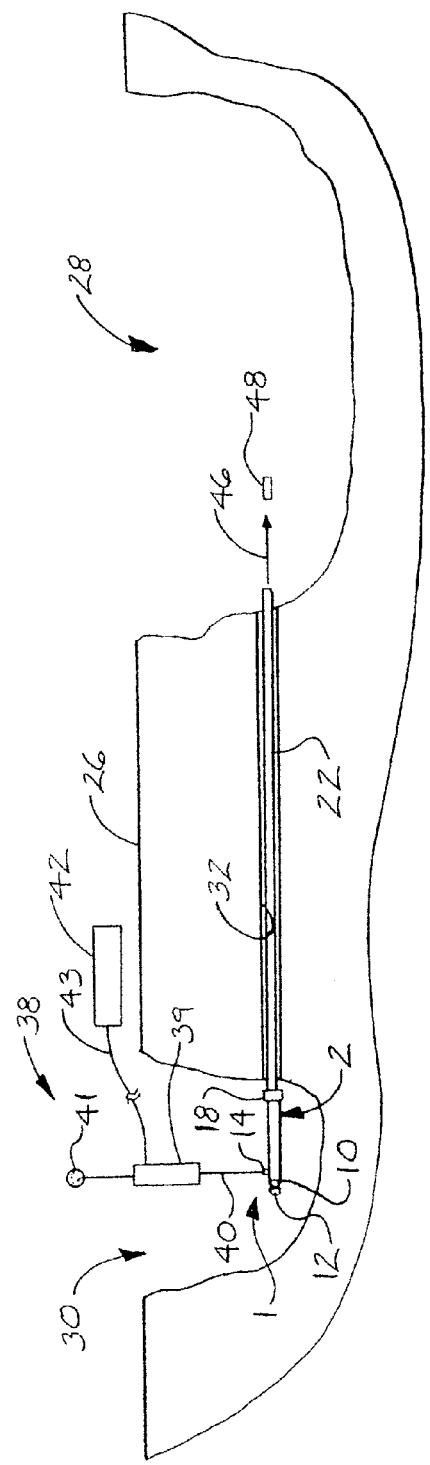

As illustrated in FIG. 6, while the device 1 remains attached to the pipe 22, the pipe 22 may be tested for the presence of one or more blockages by connecting a pneumatic pressurization apparatus 38 to the fitting 1. The pneumatic pressurization apparatus 38 may be conventional and may generally include an apparatus housing 39. An apparatus stem 40 may extend from the apparatus housing 39 and is inserted in the pressurization port opening 15 (FIG. 2) of the pressurization port 14. A pressure gauge 41 may be disposed in fluid communication with the apparatus housing 39. A compressed air source 42 is connected to the apparatus housing 39 through a connecting hose 43.

The pneumatic pressurization apparatus 38 is operated to introduce pressurized air 46 from the compressed air source 42 of the pneumatic pressurization apparatus 38 into the housing interior 4 (FIG. 2) of the transition fitting housing 2 through the pressurization port 14. Under circumstances in which no blockage is present in the pipe 22, the pressurized air 46 flows unimpeded through the housing interior 4 and the attached pipe 22, pushing the pig 48 from the housing interior 4 through the pipe 22 and discharging the pig 48 from the opposite, unattached end of the pipe 22 into the pipe insertion opening 28. Under circumstances in which a blockage (not illustrated) is present in the pipe 22, the pressurized air 46 is impeded by the blockage and fails to push the pig 48 from the pipe 22; thus, the pig 48 remains in the housing interior 4 of the transition fitting housing 2. Accordingly, under those circumstances, the pipe 22 may be retrieved from the subterranean bore 32 and checked for the presence of blockages in the pipe 22. Corrective measures may then be taken to remove the blockages from the pipe 22, after which the unblocked pipe 22 may be re-installed in the subterranean bore 32 and re-tested as was heretofore described with respect to FIGS. 3-6.

Figure 7:
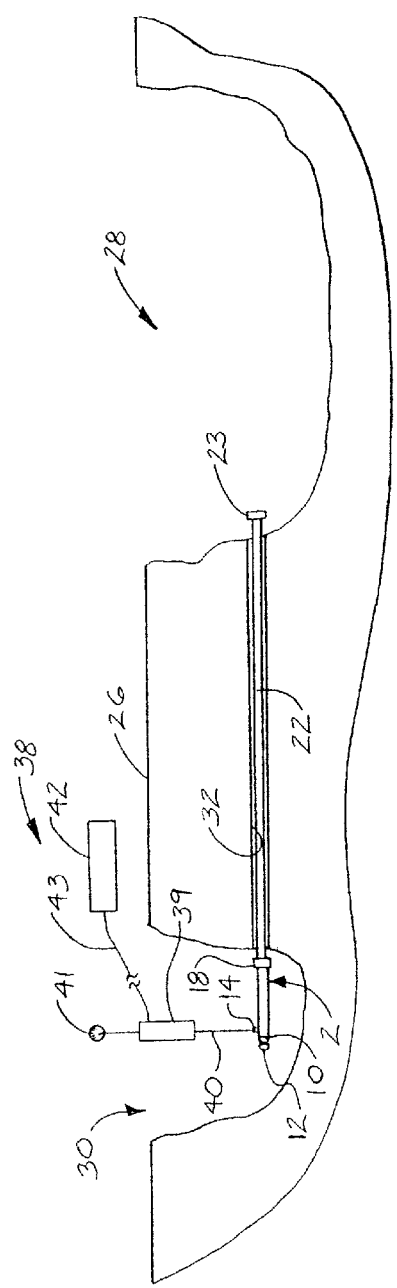

As illustrated in FIG. 7, the pipe 22 may be subjected to leak testing by placing a pipe cap 23 on the exposed end of the pipe 22 typically at the pipe insertion opening 28. The pneumatic pressurization apparatus 38 may then be operated to introduce pressurized air from the compressed air source 42 of the pneumatic pressurization apparatus 38 into the housing interior 4 (FIG. 2) of the transition fitting housing 2 and the interior of the pipe 22. As the pressurized air flows through the device 1 and the pipe 22, the pressure of the pressurized air may be noted on the pressure gauge 41. Under circumstances in which one or more leaks is not present in the pipe 22, the pressure of the pressurized air as indicated on the pressure gauge 41 rises to a predetermined pressure magnitude and remains stable throughout continued operation of the pneumatic pressurization apparatus 38. On the other hand, under circumstances in which one or more leaks is present in the pipe 22, the pressure of the pressurized air as indicated on the pressure gauge 41 fails to rise to the predetermined pressure magnitude and may be unstable, indicating the presence of at least one leak in the pipe 22. Corrective measures may then be taken to repair the leak or leaks in the pipe 22, after which the pipe 22 may be re-installed in the subterranean bore 32 and re-tested as was heretofore described with respect to FIGS. 3-7.

Figure 8:
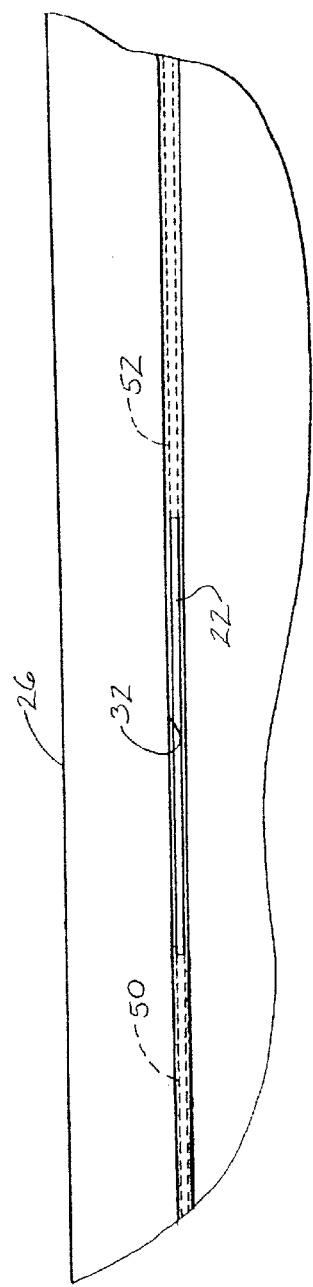

As illustrated in FIG. 8, after blockage and leakage testing of the pipe 22 is completed, the device 1 is detached from the pipe 22. Additional pipe segments 50, 52 (illustrated in phantom) may be coupled to the respective ends of the pipe 22 in the conventional manner. The pipe insertion opening 28 and the pipe pulling opening 30 (FIG. 7) may be filled in with soil. After the necessary connections to the pipe 22 are made, the pipe 22 enters service.

Figure 9:
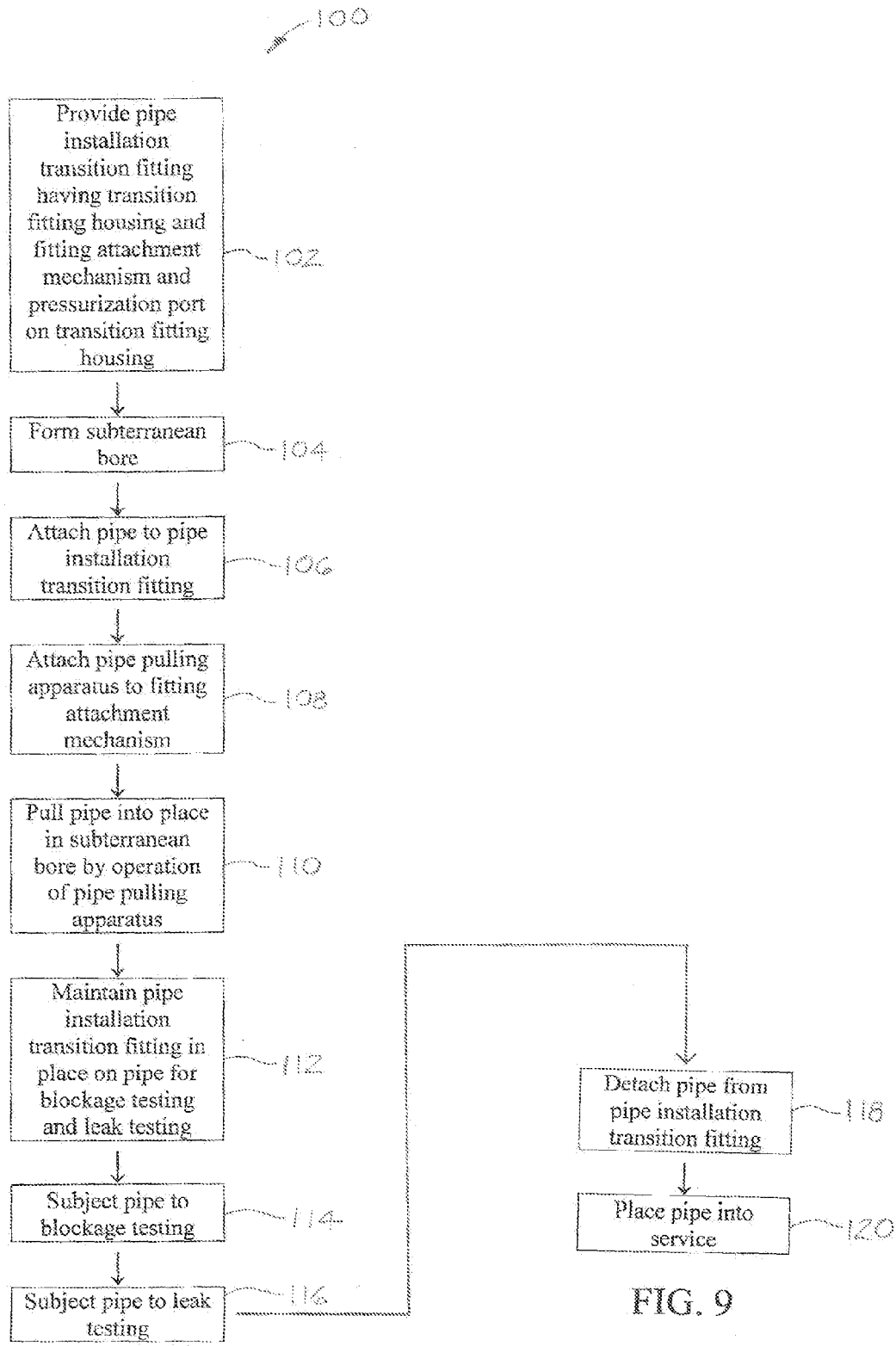
FIG. 9 is a flow diagram of an illustrative embodiment of a pipe installation method.

Referring next to FIG. 9 of the drawings, an illustrative embodiment of a pipe installation method is illustrated. In block 102, a pipe installation transmission fitting is provided. The pipe installation transmission fitting has a transition tilting housing and a fitting attachment mechanism and a pressurization port on the transition fitting housing. In block 104, a subterranean bore is formed. In block 106, a pipe is attached to the pipe installation transition fitting. In block 108, a pipe pulling apparatus is attached to the fitting attachment mechanism on the transition fitting housing of the pipe installation transition fitting. In block 110, the pipe is pulled into place in the subterranean bore by operation of the pipe pulling apparatus. In block 112, the pipe installation transition fitting remains in place on the pipe for blockage testing and leakage testing of the pipe.

In block 114, the pipe may be subjected to blockage testing. This may be accomplished by placing a pig in the transition fitting housing of the pipe installation transmission fitting, attaching a pneumatic pressurization apparatus to the pressurization port on the transition fitting housing and flowing pressurized air through the transition fitting housing and the pipe. In the event that a blockage is not present in the pipe, the pressurized air discharges the pig from the pipe. In the event that a blockage is present in the pipe, the pressurized air fails to discharge the pig from the pipe. Accordingly, the pipe may be removed from the subterranean bore and the blockage removed from the pipe, after which the pipe may be re-installed in the subterranean bore and re-tested.

In block 116, the pipe may be subjected to leakage testing. This may be accomplished by placing a pipe cap on the pipe, attaching a pneumatic pressurization apparatus to the pressurization port on, the transition fitting housing and flowing pressurized air through the transition fitting housing and the pipe. In the event that a leak is not present in the pipe, the pressure of the pressurized air flowing through the transition fitting housing and the pipe may reach and maintain a predetermined pressure magnitude. In the event that at least one leak is present in the pipe, the pressure of the pressurized air may fall below a predetermined pressure magnitude. Accordingly, the pipe may be removed from the subterranean bore and the leak repaired, after which the pipe may be re-installed in the subterranean bore and re-tested. In block 118, the pipe may be detached from the pipe installation transition fitting. In block 120, the pipe may be placed into service.

While illustrative embodiments of the disclosure have been described above, it will be recognized and understood that various modifications can be made and the appended claims are intended to cover all such modifications which may fall within the spirit and scope of the disclosure.

What is claimed is:

1. A pipe installation transition fitting, comprising:
   a transition fitting housing having a housing interior, the transition fitting housing configured to be pulled through a subterranean bore beneath the ground;
   a pig in said housing interior of said transition fitting housing;
   a fitting attachment mechanism carried by said transition fitting housing; and
   a pressurization port carried by said transition fitting housing and having a pressurization port opening communicating with said housing interior of said transition fitting housing.

2. The pipe installation transition fitting of claim 1 wherein said fitting attachment mechanism comprises a D-ring.

3. The pipe installation transition fitting of claim 2 wherein said D-ring is pivotally carried by said transition fitting housing.

4. The pipe installation transition fitting of claim 1 further comprising a transition fitting cap carried by said transition fitting housing.

5. The pipe installation transition fitting of claim 4 wherein said fitting attachment mechanism is attached to said transition fitting cap.

6. The pipe installation transition fitting of claim 1 further comprising a pipe receptacle having a pipe receptacle interior carried by said transition fitting housing.

7. The pipe installation transition fitting of claim 1 wherein said transition fitting housing is generally elongated and cylindrical.

8. A pipe installation transition fitting, comprising:
   a transition fitting housing having a first housing end, a second housing end opposite said first housing end and a housing interior extending between said first housing end and said second housing end, the transition fitting housing configured to be pulled through a subterranean bore beneath the ground;
   a pig in said housing interior of said transition fitting housing;
   a fitting attachment mechanism carried by said first housing end of said transition fitting housing, the fitting attachment mechanism facilitates attachment of said transition fitting housing to a pipe pulling cable; and
   a pressurization port carried by said transition fitting housing between said first housing end and said second housing end and having a pressurization port opening communicating with said housing interior of said transition fitting housing.

9. The pipe installation transition fitting of claim 8 wherein said fitting attachment mechanism comprises a D-ring.

10. The pipe installation transition fitting of claim 9 wherein said D-ring is pivotally carried by said transition fitting housing.

11. The pipe installation transition fitting of claim 8 further comprising a transition fitting cap carried by said first housing end of said transition fitting housing.

12. The pipe installation transition fitting of claim 11 wherein said fitting attachment mechanism is carried by said transition fitting cap.

13. The pipe installation transition fitting of claim 8 further comprising a pipe receptacle having a pipe receptacle interior carried by said second housing end of said transition fitting housing.

14. The pipe installation transition fitting of claim 8 wherein said transition fitting housing is generally elongated and cylindrical.

15. A pipe installation method, comprising:
   providing a pipe installation transition fitting having a transmission fitting housing and a fitting attachment mechanism and a pressurization port on said transition fitting housing;
   forming a subterranean bore;
   attaching a pipe to said pipe installation transition fitting;
   placing a pig in said pipe installation transition fitting;

attaching a pipe pulling apparatus to said fitting attachment mechanism;

pulling said pipe into place in said subterranean bore by operation of said pipe pulling apparatus;

maintaining said pipe installation transition fitting in place on said pipe;

testing said pipe by flowing pressurized air through said pressurization port into said transmission fitting housing and said pipe and discharging said pig from said pipe by said flowing pressurized air through said pressurization port into said transmission fitting housing and said pipe;

detaching said pipe from said pipe installation transition fitting; and placing said pipe into service.

16. The pipe installation method of claim 15 wherein said testing said pipe comprises conducting blockage testing on said pipe.

17. The pipe installation method of claim 15 wherein said testing said pipe comprises conducting leakage testing on said pipe.

* * * * *